(12) United States Patent
Mar

(10) Patent No.: US 7,047,345 B2
(45) Date of Patent: May 16, 2006

(54) LOGIC CONFIGURED FOR COMPLIMENTING DATA ON A BUS WHEN THRESHOLD EXCEEDED

(75) Inventor: Eugene Mar, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 269 days.

(21) Appl. No.: 10/774,189

(22) Filed: Feb. 5, 2004

(65) Prior Publication Data

US 2005/0188181 A1 Aug. 25, 2005

(51) Int. Cl.
G06F 7/38 (2006.01)
G06F 13/38 (2006.01)

(52) U.S. Cl. .......................... 710/305; 710/34; 712/220

(58) Field of Classification Search ................ 710/305, 710/100, 34, 65; 365/49, 63, 190, 205, 233.5; 713/502, 320; 327/518; 326/35, 86; 370/464, 370/476; 712/220
See application file for complete search history.

(56) References Cited

U.S. PATENT DOCUMENTS

| | | | |
|---|---|---|---|
| 5,168,531 A * | 12/1992 | Sigel | ........................... 382/291 |
| 5,684,997 A | 11/1997 | Kau et al. | |
| 5,710,911 A | 1/1998 | Walsh et al. | |
| 5,713,006 A | 1/1998 | Shigeeda | |
| 5,721,933 A | 2/1998 | Walsh et al. | |
| 5,724,553 A | 3/1998 | Shigeeda | |
| 5,727,221 A | 3/1998 | Walsh et al. | |
| 5,729,720 A | 3/1998 | Kau et al. | |
| 5,734,919 A | 3/1998 | Walsh et al. | |
| 5,737,563 A | 4/1998 | Shigeeda | |
| 5,737,748 A | 4/1998 | Shigeeda | |
| 5,737,764 A | 4/1998 | Shigeeda | |
| 5,754,436 A | 5/1998 | Walsh et al. | |
| 5,754,837 A | 5/1998 | Walsh et al. | |
| 5,771,373 A | 6/1998 | Kau et al. | |
| 5,778,425 A | 7/1998 | Shigeeda | |
| 5,781,780 A | 7/1998 | Walsh et al. | |
| 5,784,291 A | 7/1998 | Chen et al. | |
| 5,802,555 A | 9/1998 | Shigeeda | |
| 5,805,854 A | 9/1998 | Shigeeda | |
| 5,822,550 A | 10/1998 | Milhaupt et al. | |
| 5,835,733 A | 11/1998 | Walsh et al. | |
| 5,842,005 A | 11/1998 | Walsh et al. | |
| 5,845,132 A | 12/1998 | Walsh et al. | |
| 5,848,253 A | 12/1998 | Walsh et al. | |
| 5,852,370 A | 12/1998 | Ko | |
| 5,864,702 A | 1/1999 | Walsh et al. | |
| 5,867,717 A | 2/1999 | Milhaupt et al. | |
| 5,870,617 A | 2/1999 | Walsh et al. | |
| 5,870,621 A | 2/1999 | Walsh et al. | |
| 5,872,983 A | 2/1999 | Walsh et al. | |
| 5,875,312 A | 2/1999 | Walsh et al. | |
| 5,943,507 A | 8/1999 | Cornish et al. | |

(Continued)

OTHER PUBLICATIONS

"Using complementation and resequencing to minimize transitions" by Murgai et al. (abstract only) Publication Date: Jun. 15-19, 1998.*

(Continued)

Primary Examiner—Gopal C. Ray

(57) ABSTRACT

A system includes logic configured for counting transitions between data on a bus and data to be put onto the bus. Where the counted transitions exceed a threshold, the data to be put onto the bus is complemented. As a result, complemented data is put on the bus where the threshold was exceeded and un-complemented data is put on the bus where the threshold was not exceeded.

33 Claims, 3 Drawing Sheets

U.S. PATENT DOCUMENTS

| | | | |
|---|---|---|---|
| 5,987,244 A | 11/1999 | Kau et al. | |
| 6,112,273 A | 8/2000 | Kau et al. | |
| 6,182,203 B1 | 1/2001 | Simar, Jr. et al. | |
| 6,421,754 B1 | 7/2002 | Kau et al. | |
| 6,493,827 B1 * | 12/2002 | Mueller et al. | 713/300 |
| 6,624,670 B1 | 9/2003 | Payne et al. | |
| 6,674,897 B1 * | 1/2004 | Sugisaki et al. | 382/166 |
| 6,819,578 B1 * | 11/2004 | Regev | 365/49 |
| 2003/0058674 A1 * | 3/2003 | Regev | 365/49 |

OTHER PUBLICATIONS

Philips Semiconductors Product Specification, "74HC/HCT390—Dual decade ripple counter," Dec. 1990, pp. 1-7.

TechEncyclopedia, "TMDS (Transition Minimized Differential Signaling)," retrieved from the internet at www.techweb.com/encyclopedia/defineterm?term=TMDS on Dec. 5, 2003, pp. 1-3.

* cited by examiner

LOGIC CONFIGURED FOR COMPLIMENTING DATA ON A BUS WHEN THRESHOLD EXCEEDED

BACKGROUND

A growing number of applications, such as video, require the very rapid transmission of very large amounts of data. Such transmission may result in the expenditure of a significant amount of electrical power, and may additionally result in the generation of a significant amount of EMI (electro-magnetic interference).

For example, in an exemplary video application, micro electro-mechanical devices (MEMs) are used in the display of data. Such devices contain a RAM (random access memory) cell, wherein the condition of the cell (e.g. either a one or zero) controls the state of a mirror. Accordingly, by moving large amounts of data (e.g. 50 Mbits/second) a screen configured with MEM devices could be controlled. As can easily be seen, the bus supplying this data may expend considerable energy, and may generate considerable unwanted EMI.

Accordingly, improvements in bus design resulting in lower energy requirements and less EMI would be desirable.

SUMMARY

A system includes logic configured for counting transitions between data on a bus and data to be put onto the bus. Where the counted transitions exceed a threshold, the data to be put onto the bus is complemented. As a result, complemented data is put on the bus where the threshold was exceeded and un-complemented data is put on the bus where the threshold was not exceeded.

BRIEF DESCRIPTION OF THE DRAWINGS

The following detailed description refers to the accompanying figures. In the figures, the left-most digit(s) of a reference number identifies the figure (Fig.) in which the reference number first appears. Moreover, the same reference numbers are used throughout the drawings to reference like features and components.

DETAILED DESCRIPTION

A system for operation of a bus configured to provide low power consumption and low EMI emissions is disclosed. Power consumption is reduced by reducing operation of components controlling the frequency of the need to raise and lower lines within the data bus (e.g. toggling lines between high voltage and low voltage). EMI emissions are similarly reduced by reduction of the toggling of data lines within the data bus. The system includes logic configured for counting transitions between data currently on a bus and data to be put onto the bus. For example, a transition would result where an individual line in the data bus moves from high (or low) voltage to low (or high) voltage. However, no transition would result on the individual line where it stayed at high (or low) voltage. Where the counted transitions exceed a threshold, the data to be put onto the bus is complemented, and the complemented data is put on the bus instead. Accordingly, complemented data is put on the bus where the threshold was exceeded and un-complemented data is put on the bus where the threshold was not exceeded. By setting the threshold at a value of approximately half the width of the bus (e.g. 8 for a 16-bit data bus) using the complemented data where the number of transitions exceeds the threshold and un-complemented data where the number of transitions does not exceed the threshold will limit the transitions to at most half the number of bits in the bus for each data cycle. Thus, complementing data to be put onto the data bus under conditions wherein the threshold is exceeded can dramatically cut the power consumption required to transition data lines within the bus, and also the resultant EMI emissions.

Figure 1:
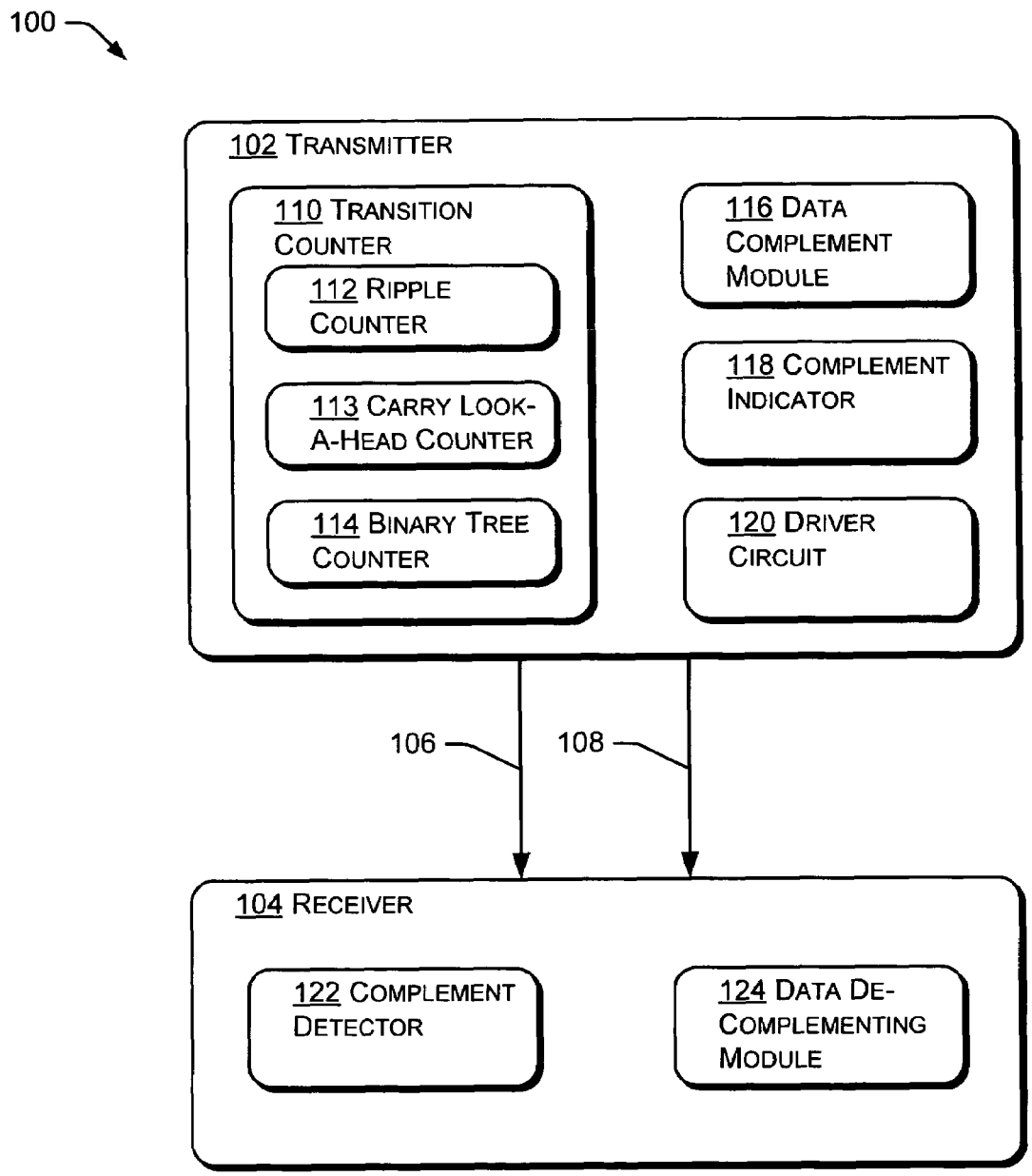
FIG. 1 is a block diagram illustrating an exemplary system including a bus configured for low power consumption and low EMI emissions.

FIG. 1 is a block diagram illustrating an exemplary system 100 configured data transmission having low power consumption and low EMI emissions. A transmitter 102 communicates with a receiver 104 over a bus 106 and signal line 108. While the system 100 illustrates data transmission from the transmitter 102 to the receiver 104, the system 100 could be extended to provide two-way data transmission.

A transition counter 110 is configured to compare the data currently being transmitted on the data bus 106 with the data which will be transmitted on the next cycle of the data bus. As will be seen in greater detail in the discussion of FIG. 2, the transition counter 110 is configured to compare the data currently on each line within the data bus to the data which will next be on the data bus (i.e. "future" data). Where the current data and the future data are the same (e.g. both "high" voltage or both "low" voltage) on any given data line within the bus, there is no transition. Where the current data is high (or low) and the future data is low (or high) there is a transition (e.g. from high to low or from low to high). In an exemplary 8-bit bus, where the current data is 00110000 and the future data (for the next clock cycle of the data bus) is 00111111, there are 4 transitions, since the first 4 bits are the same, but the last 4 bits "transitioned".

Three exemplary implementations of the transition counter 110 are seen in FIG. 1. A ripple counter 112, a carry look-a-head counter 113, a binary tree counter 114 or other counters may be used to count the transitions. Note that while three exemplary implementations of transition counter 110 are disclosed, they are merely illustrative, and that many other implementations of the transition counter 110 could similarly be employed. Accordingly, the concepts disclosed herein are not dependent on a particular selection of a counter.

A data complement module 116 is configured to complement the data which is to be put on the data bus 106 if the number of transitions exceeded the threshold. The process by which data is complemented reverses every bit. For example, where the data bus 106 is eight bits wide, and the data is 11000011, the complement would be 00111100. In operation, the data complement module 116 operates in response to a determination by the transition counter that the number of transitions exceeded the threshold. For example, where the current data on the data bus is 11110000, and the data to be put onto the data bus is 11110001 it would not make sense to complement the data to be put onto the data bus, since this data is separated from the current data by only one transition (in the last bit). However, if the current data on the data bus is 11100011, it would make sense to complement 00011111, since this data is separated from the current data by six transitions (the first 6 bits), as would be revealed by the transition counter 110. In particular, the six transitions would exceed a threshold set at four (half the width of the 8-bit bus), requiring the operation of the data complement module 116.

A complement indicator module 118 is configured to operate the signal line 108 in a manner which indicates whether or not the data complement module 116 was used to complement the data. Accordingly, the status of the data on the data bus 106, either complemented or not complemented, can always be determined by the status of the signal line 108, which is regulated by the complement indicator 118.

A driver circuit 120 is configured to put the new data, complemented or not, onto the bus 106.

A complement detector 122 within the receiver 104 is configured to detect whether the data on the data bus 106 is complemented by examination of the signal line 108. Where the data is complemented, the data de-complementing module 124 is configured to de-complement the data by reversing each data bit.

Figure 2:
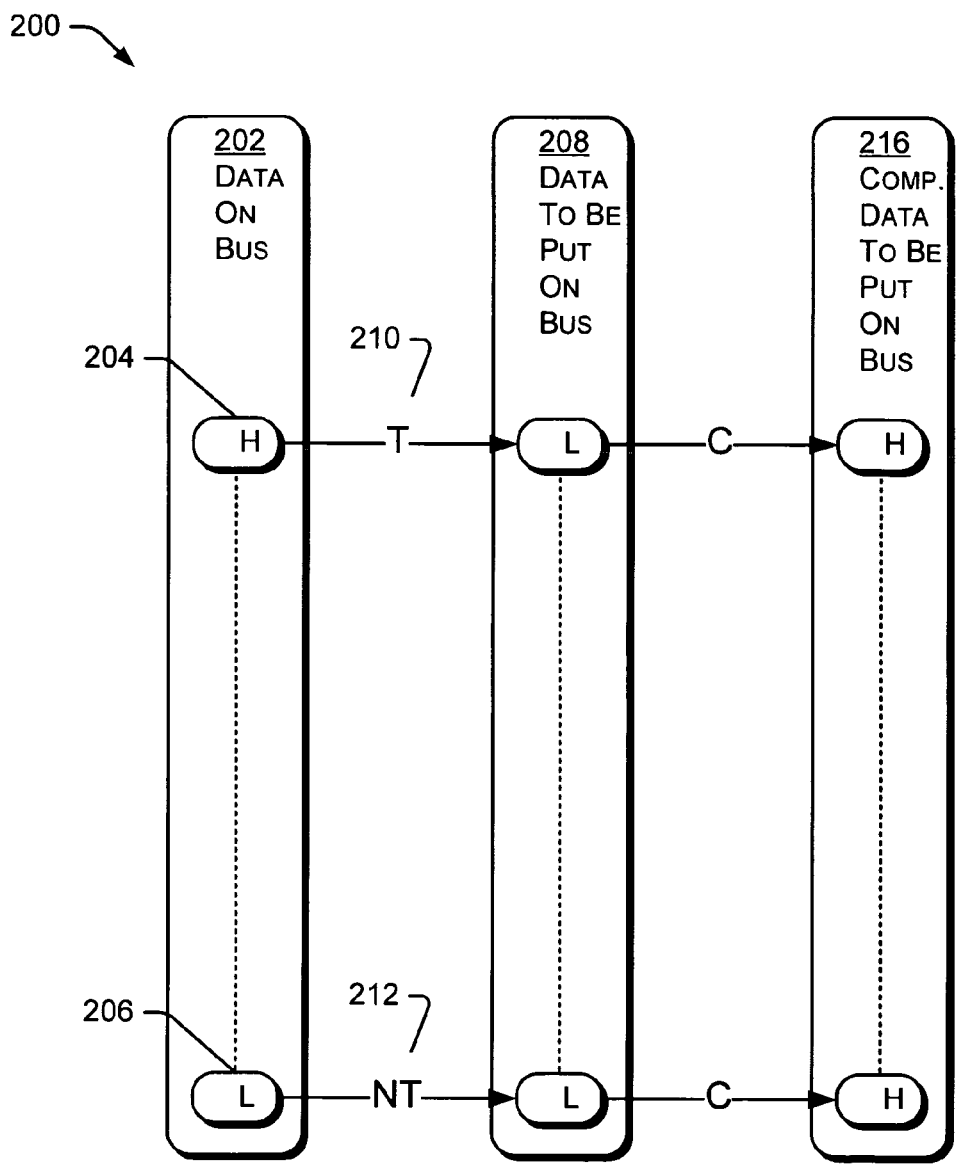
FIG. 2 is block diagram illustrating an exemplary process during which transitions between data on adjacent data cycles of a bus are counted, and data is complemented when appropriate.
Figure 2:
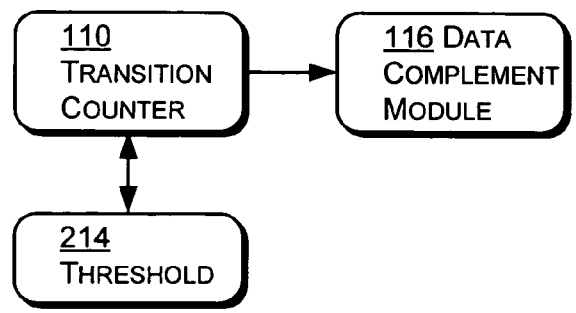

FIG. 2 is block diagram illustrating an exemplary process 200 during which transitions between data on adjacent data cycles of a bus are counted, and data is complemented when appropriate. Block 202 represents data on the data bus 106 (FIG. 1). The data is represented by a plurality of high and low data lines. wherein bit 0 and bit N 204, 206 are illustrated as high and low, respectively. The transition counter 110 counts the transitions required between the data 202 currently on the data bus and the un-complemented data 208 to be put on the data bus. In particular, bit 204 is "high" voltage (e.g. a "1") and is transitioned (T) at 210 to a low bit (e.g. a "0"). In contrast, bit 206 is not transitioned (NT) at 212, since it starts as a low voltage and remains at low voltage. Accordingly, by comparing the data 202 currently on the data bus and the un-complemented data 208 to be put on the data bus, the transition counter 110 is able to count the number of transitions between the data 202 on the bus and the un-complemented data 208 to be put on the bus. Having made the count, the transition counter 110 compares the count to the threshold 214 to determine if a complement 216 of the un-complemented data 208 to be put on the bus should be made by the data complement module 116. In general, the data complement module 116 creates a complement 216 of the data 208 to be put on the bus when a number of differing bits between the complement 216 and the data 202 is less than a number of differing bits between the un-complemented data 208 the data 202. Thus, the data to be put onto the bus is either the un-complemented data 208 or the complemented data 216, depending on which has more bits in common with the current data 202, wherein bits in common are bit locations (e.g. bit 5 on an 8-bit bus) which have a common value (e.g. both are "high" or "1").

Figure 3A:
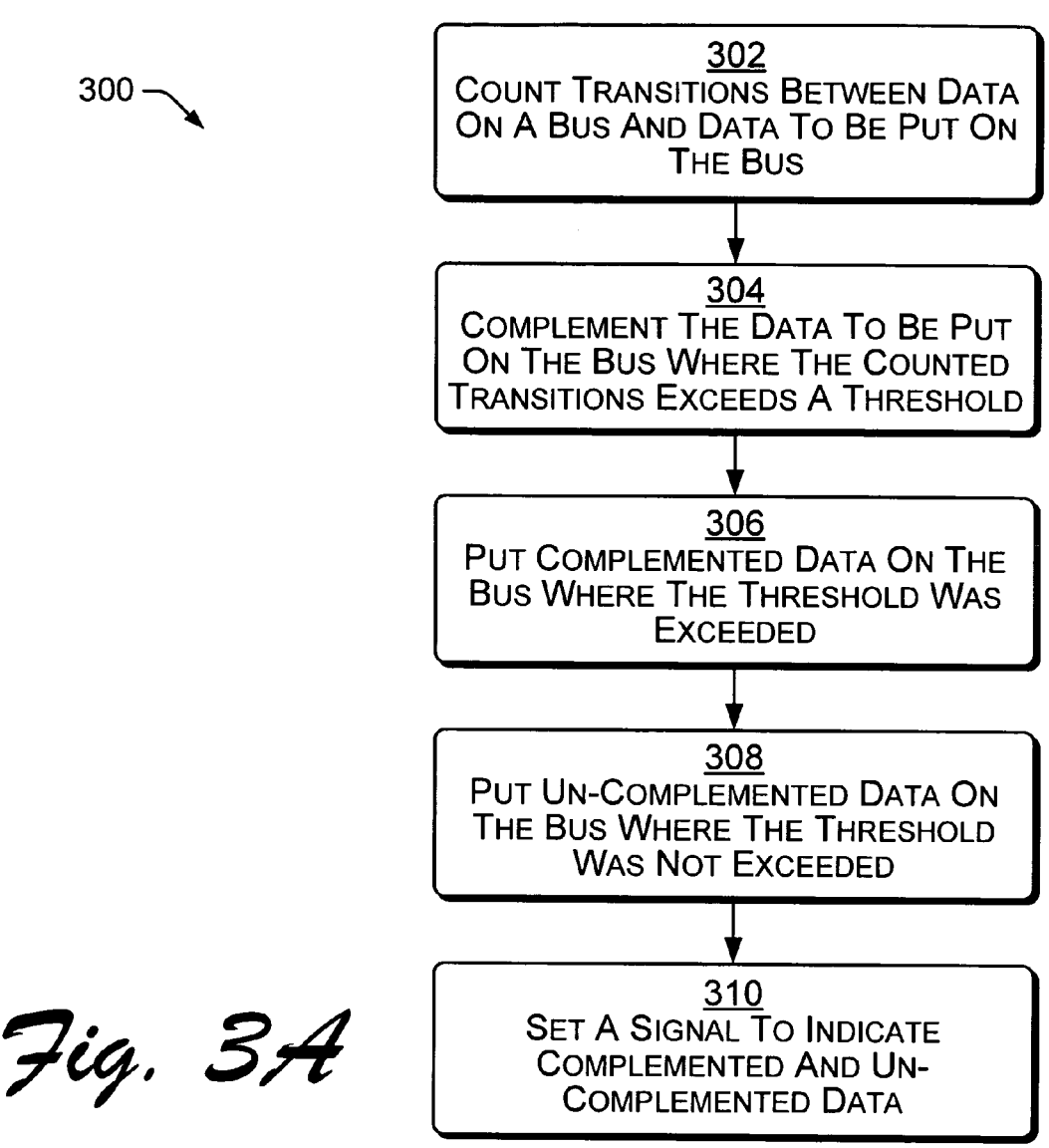
FIG. 3A is a flow diagram that describes the operation of a transmitter in an implementation of a bus configured for low power consumption and low EMI emissions.

The flow chart of FIG. 3A illustrates a further exemplary implementation, wherein a method 300 is employed to operate a transmitter on a bus configured for low power consumption and low EMI emissions. The elements of the method may be performed by any desired means, such as by the execution of processor-readable instructions defined on a processor-readable media, such as a disk, a ROM or other memory device or by operation of an application specific integrated circuit (ASIC) or other hardware device. In one implementation, the ROM may contain firmware implementing the system 100 of FIG. 1 according to an exemplary method as seen in the flow chart of FIG. 3. In an alternative implementation, an ASIC or other hardware device may contain logic which implements system 100 according to an exemplary method as seen in the flow chart of FIG. 3. Also, actions described in any block may be performed in parallel with actions described in other blocks, may occur in an alternate order, or may be distributed in a manner which associates actions with more than one other block.

At block 302, transitions are counted between data on a bus and data to be put on the bus. In the exemplary system 100 of FIG. 1, the transitions were counted by the transition counter 110. Note that the transitions are differences between similarly located bits on the data 202 (FIG. 2) on the data bus 106 and the data 208 (FIG. 2) which could follow it onto the data bus. Thus, if the data on the bus was 00001111 and the data which could follow it was 10001111, then the data in one location would be different, causing that data line to "transition".

At block 304, the data 208 (FIG. 2) to be put onto the data bus is complemented where the counted transitions exceed a threshold. In the exemplary system 100 of FIG. 1, the complement would be performed by the data complement module 116. As seen above, where the threshold is set to a number equal to half the bits on the data bus (e.g. set the threshold to 8 if the data bus is 16 bits wide), then data is complemented to prevent the need for over half the data lines on the data bus to "transition" from one value to anther value.

At block 306, where the threshold was exceeded by the required transitions counted at block 302, the complemented data is put onto the bus. Alternatively, at bloc 308, where the threshold was not exceeded by the required transitions counted at block 302, the un-complemented data is put onto the bus.

Figure 3B:
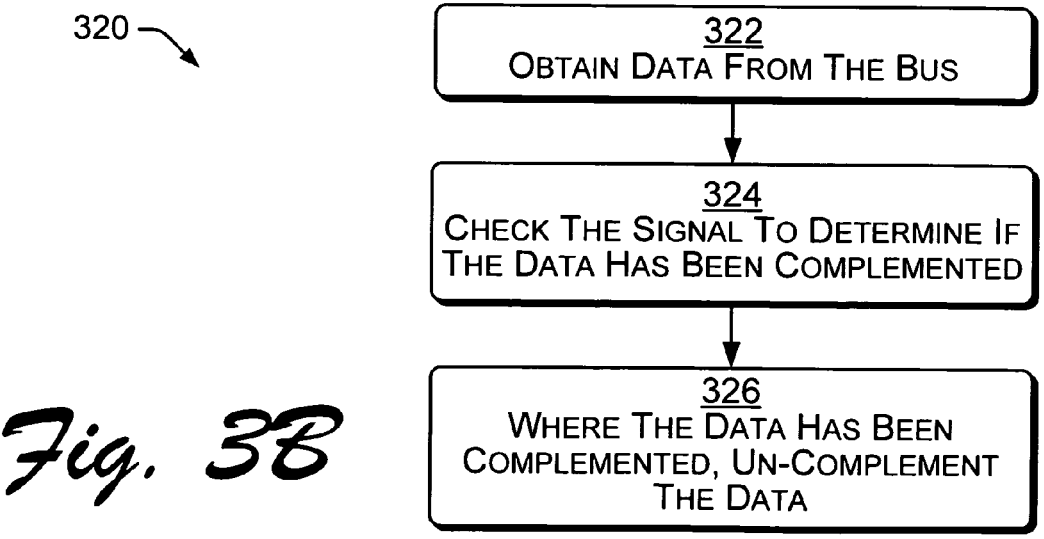
FIG. 3B is a flow diagram that describes the operation of a receiver in an implementation of a bus configured for low power consumption and low EMI emissions.

The flow chart of FIG. 3B illustrates a further exemplary implementation, wherein a method 320 is employed to operate a receiver on a bus configured for low power consumption and low EMI emissions. The elements of the method may be performed by any desired means, as indicated with respect to method 300, above. At block 322, the signal line 108 (FIG. 1) is set to indicate the presence of complemented data or un-complemented data on the data bus 106. In the exemplary system 100 of FIG. 1, the control over the signal line 108 would be performed by the compliment indicator controller 118.

At block 324, a receiver obtains data from the bus 106. In the example of FIG. 1, the receiver 104 obtains data sent by the transmitter 102. At block 314, the receiver checks the signal line 108 to determine if the data on the data bus has been complemented. At block 326, where the data on the data bus has been complemented (as determined by observation of the signal line 108) the data is un-complemented, such as by a data de-complementing module 124 (FIG. 1).

Although the above disclosure has been described in language specific to structural features and/or methodological steps, it is to be understood that the appended claims are not limited to the specific features or steps described. Rather, the specific features and steps are exemplary forms of implementing this disclosure. For example, counting transitions between data on a bus and data to be put onto the bus could be done by any number of hardware, software and firmware implementations. The disclosed implementations—involving use of a ripple counter, a binary tree counter or a carry look-a-head counter—are meant only to be representative of several of the many ways in which this functionality could be performed. Accordingly, while these specific means are disclosed as examples, they are not meant to be construed in any way to be limiting. In a further example, while actions described in blocks of the flow diagrams may be performed in parallel with actions described in other blocks, the actions may occur in an alternate order, or may be distributed in a manner which associates actions with more than one other block. And further, while elements of the methods disclosed are intended to be performed in any desired manner, it is anticipated that logic, such as an ASIC or other hardware device, or computer- or processor-readable instructions, performed by a computer and/or processor, reading from a computer- or processor-readable media, such as a ROM, disk or CD ROM, would be preferred.

The invention claimed is:

1. A system comprising logic configured for:
   counting transitions between data on a bus and data to be put onto the bus;
   complementing the data to be put onto the bus where the counted transitions exceeds a threshold;
   putting complemented data on the bus where the threshold was exceeded; and
   putting un-complemented data on the bus where the threshold was not exceeded.

2. The system as recited in claim 1, wherein the logic configured for counting transitions comprises a ripple counter.

3. The system as recited in claim 1, wherein the logic configured for counting transitions comprises a binary tree.

4. The system as recited in claim 1, wherein the logic configured for counting transitions comprises a carry look-a-head counter.

5. The system as recited in claim 1, additionally comprising logic configured for setting the threshold at one-half of a width of the bus.

6. The system as recited in claim 1, additionally comprising logic configured for setting a signal to indicate complemented and un-complemented data.

7. The system as recited in claim 1, additionally comprising logic configured for setting a signal according to a number of transitions relative to the threshold.

8. The system as recited in claim 1, additionally comprising logic configured for:
   obtaining data from the bus;
   checking a signal to determine if the data has been complemented; and
   where the data has been complemented, un-complementing the data.

9. A method of transmitting data, comprising:
   counting transitions between data on a bus and data to be put onto the bus;
   complementing the data to be put onto the bus where a number of transitions exceeds a threshold;
   putting complemented data on the bus where the threshold was exceeded; and
   putting un-complemented data on the bus where the threshold was not exceeded.

10. The method as recited in claim 9, wherein counting the transitions comprises counting the transitions using a ripple counter.

11. The method as recited in claim 9, wherein counting the transitions comprises counting the transitions using a binary tree.

12. The method as recited in claim 9, wherein counting the transitions comprises counting the transitions using a carry look-a-head counter.

13. The method as recited in claim 9, additionally comprising setting the threshold at one-half of a width of the bus.

14. The method as recited in claim 9, additionally comprising setting a signal to indicate complemented and un-complemented data.

15. The method as recited in claim 9, additionally comprising:
   obtaining data from the bus;
   checking a signal to determine if the data has been complemented; and
   where the data has been complemented, un-complementing the data.

16. A bus configured for low power consumption and low EMI emissions, comprising:
   a transition counter, to count transitions between a first data transmission and a second data transmission and to compare the counted transitions to a threshold;
   a data complement module, to complement the second data transmission where the threshold was exceeded;
   a driver circuit to change voltages on data lines from the first data transmission to the second data transmission; and
   a complement indicator, to operate a signal to indicate if the second data transmission is complemented.

17. The bus of claim 16, wherein the transition counter comprises a ripple counter.

18. The bus of claim 16, wherein the transition counter comprises a binary tree counter.

19. The bus of claim 16, wherein the transition counter comprises a carry look-a-head counter.

20. The bus of claim 16, wherein output of the transition counter controls operation of the data complement module and the complement indicator.

21. The bus of claim 16, additional comprising:
   a complement detector communicate to monitor the signal line; and
   a data de-complementing module to de-complement the data, if indicated by the signal line.

22. The bus of claim 16, additional comprising:
   a complement detector, to detected the signal indicating that the data transmitted is complemented.

23. The bus of claim 16, additional comprising:
   a data de-complementing module, to reverse changes made by the data complement module.

24. A system for data transmission, comprising:
   means for counting transitions between data on a bus and data to be put onto the bus;
   means for complementing the data to be put onto the bus where the counted transitions exceeds a threshold;
   means for putting complemented data on the bus where the threshold was exceeded; and
   means for putting un-complemented data on the bus where the threshold was not exceeded.

25. The system as recited in claim 24, wherein the means for counting transitions comprises a binary tree.

26. The system as recited in claim 24, additionally comprising means for setting the threshold at one-half of a width of the bus.

27. The system as recited in claim 24, additionally comprising means for setting a signal to indicate complemented and un-complemented data.

28. The system as recited in claim 24, additionally comprising means for setting a signal according to a number of transitions relative to the threshold.

29. A processor-readable medium comprising processor-executable instructions for:

counting transitions between data on a bus and data to be put onto the bus;

complementing the data to be put onto the bus where the counted transitions exceeds a threshold;

putting complemented data on the bus where the threshold was exceeded; and putting un-complemented data on the bus where the threshold was not exceeded.

30. The processor-readable medium as recited in claim 29, additionally comprising instructions for setting the threshold at one-half of a width of the bus.

31. The processor-readable medium as recited in claim 29, additionally comprising instructions for setting a signal to indicate complemented and un-complemented data.

32. The processor-readable medium as recited in claim 29, additionally comprising instructions for:

obtaining data from the bus;

checking a signal to determine if the data has been complemented; and where the data has been complemented, un-complementing the data.

33. The processor-readable medium as recited in claim 29, additionally comprising instructions for:

obtaining data from the bus;

checking a signal to determine if the data has been complemented; and where the data has been complemented, un-complementing the data.

* * * * *